United States Patent
Wang

(10) Patent No.: US 6,771,020 B1
(45) Date of Patent: Aug. 3, 2004

(54) DOUBLE-FACE LIGHTING ELECTRO LUMINESCENT DEVICE

(75) Inventor: Chih Yuan Wang, Taichung Hsien (TW)

(73) Assignee: Wintek Corporation, Taichung (TW)

(*) Notice: Subject to any disclaimer, the term of this patent is extended or adjusted under 35 U.S.C. 154(b) by 0 days.

(21) Appl. No.: 10/369,704

(22) Filed: Feb. 21, 2003

(51) Int. Cl.⁷ .................................................. H01J 1/62

(52) U.S. Cl. ...................................... 313/506; 313/498

(58) Field of Search ............................... 313/498, 506, 313/509, 512

(56) References Cited

FOREIGN PATENT DOCUMENTS

JP          08203669 A   *  8/1996

* cited by examiner

*Primary Examiner*—Vip Patel
(74) *Attorney, Agent, or Firm*—Rosenberg, Klein & Lee

(57) ABSTRACT

A double-face lighting electro luminescent device includes a back electrode layer and two lighting sets. Each lighting set is composed of a lighting layer, a front electrode layer and a transparent substrate which are sequentially overlaid on the opposite faces of the back electrode layer. The back electrode layer is co-used by the two lighting sets. The two front electrode layers and the back electrode layer control the lighting layers of the two lighting sets to respectively emit light.

6 Claims, 4 Drawing Sheets

DOUBLE-FACE LIGHTING ELECTRO LUMINESCENT DEVICE

BACKGROUND OF THE INVENTION

The present invention is related to a double-face lighting electro luminescent device including two lighting sets and a back electrode layer co-used by the two lighting sets to emit light from double faces.

A conventional electro luminescent (EL) cell is mainly used as backlight cell, advertisement sign or decoration.

Referring to FIG. 3, a EL cell 8 is a thin sheet composed of a transparent substrate 81, a front electrode layer 82, a lighting layer 83, a back electrode layer 84 and an insulating packaging layer 85 which are sequentially overlaid on the transparent substrate 81. By means of applying AC voltage between the front and back electrode layers 82, 84, the lighting layer 83 emits light through the transparent substrate 81.

In the same lighting area, the above EL cell 8 can only emit light from one face to serve as backlight of liquid crystal display module 9. In the case that the EL cell is applied to a mobile phone with double panels, it is necessary to use two EL cells 8 in cooperation with two liquid crystal display modules 9 as shown in FIG. 4. Such measure is troublesome and time-consuming and leads to waste of material.

SUMMARY OF THE INVENTION

It is therefore a primary object of the present invention to provide a double-face lighting electro luminescent device in which two lighting sets are respectively overlaid on two opposite faces of the back electrode layer. The back electrode layer is co-used by the two lighting sets. Two front electrode layers and the back electrode layer independently control the lighting sets to respectively emit light. Accordingly, one single EL device can achieve double-face lighting effect.

It is a further object of the present invention to provide the above double-face lighting electro luminescent device in which one back electrode layer is co-used by two lighting sets. In addition, the transparent substrates of the two lighting sets achieve the insulating packaging effect. Therefore, the processing time is shortened and the material is saved.

According to the above objects, the double-face lighting electro luminescent device of the present invention includes a back electrode layer and two lighting sets overlapped with the back electrode layer. The back electrode layer has a first face and a second face opposite to the first face. The two lighting sets are respectively overlaid on the first and second faces. Each lighting set is composed of a lighting layer, a front electrode layer and a film-like transparent substrate which are sequentially overlaid on each of the first and second faces, whereby the two front electrode layers and the back electrode layer control the lighting layers of the lighting sets to emit light.

The present invention can be best understood through the following description and accompanying drawings wherein:

DETAILED DESCRIPTION OF THE PREFERRED EMBODIMENTS

Figure 1:
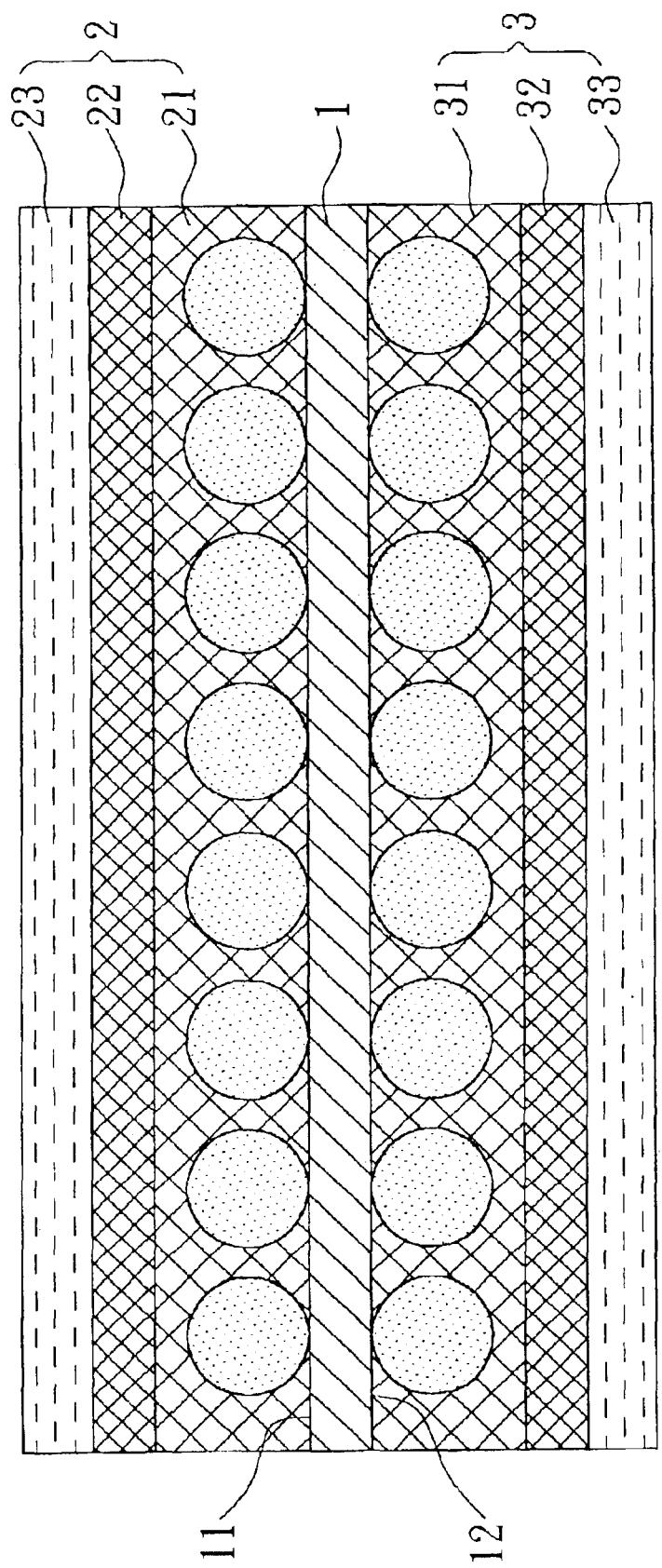
FIG. 1 is a sectional view of the double-face electro luminescent device of the present invention.
Figure 2:
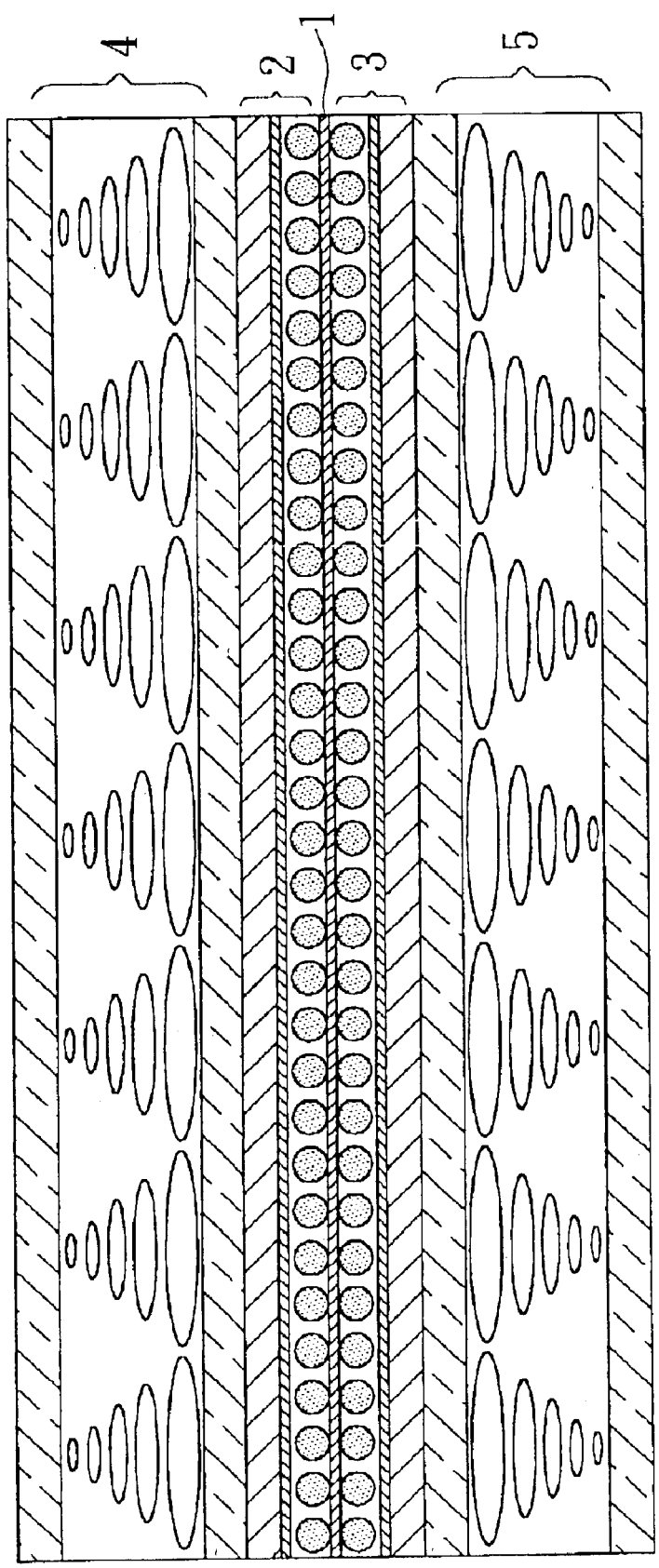
FIG. 2 is a sectional view of the double-face electro luminescent device of the present invention, in which two liquid crystal display modules are overlaid thereon.
Figure 3:
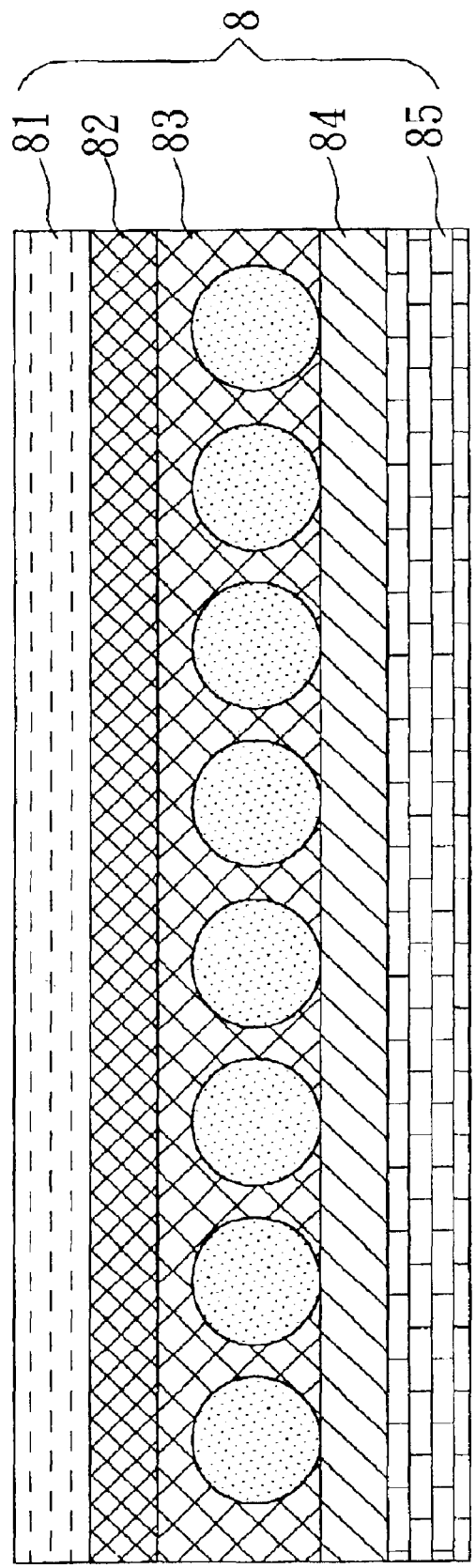
FIG. 3 is a sectional view of a conventional electro luminescent cell.
Figure 4:
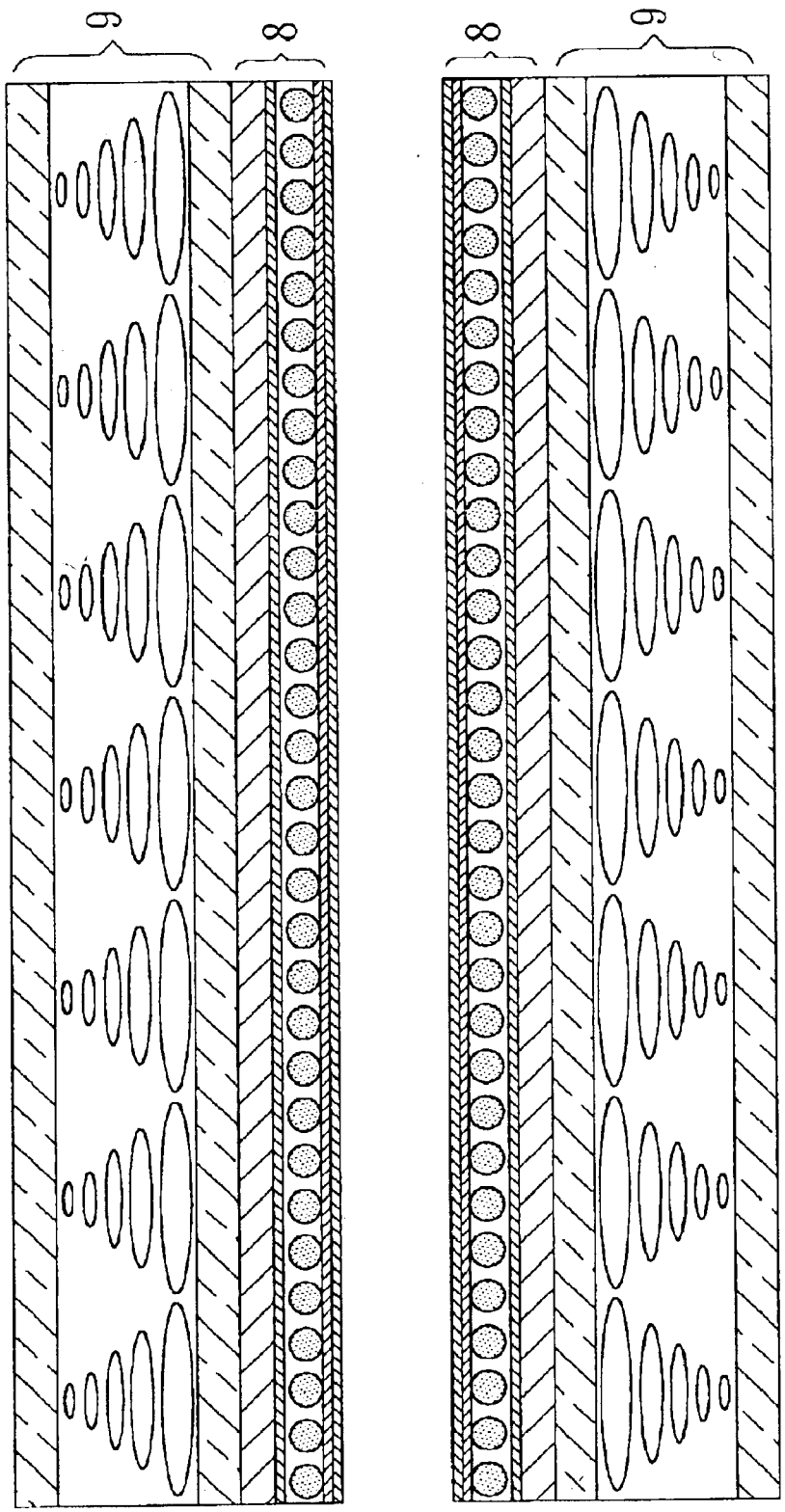
FIG. 4 is a sectional view showing that two liquid crystal display modules are used with two conventional electro luminescent cells.

Please refer to FIGS. 1 and 2. The double-face lighting electro luminescent (EL) device of the present invention includes a back electrode layer 1 and two lighting sets 2, 3 overlapped with the back electrode layer 1.

The back electrode layer 1 has a first face 11 and a second face 12 opposite to the first face 11. The two lighting sets 2, 3 are respectively overlapped with the first and second faces 11, 12. Each lighting set 2, 3 is composed of a lighting layer 21, 31, a front electrode layer 22, 32 and a film-like transparent substrate 23, 33 which are sequentially overlaid on each of the first and second faces 11, 12. The two front electrode layers 22, 32 and the back electrode layer 1 serve to control the lighting layers 21, 31 of the lighting sets 2, 3 to emit light.

When the double-face lighting electro luminescent (EL) device of the present invention is applied to a double-panel mobile phone, two liquid crystal display modules 4, 5 are used with the two transparent substrates 23, 33. The double-face lighting electro luminescent (EL) device of the present invention serves to provide necessary backlight for the liquid crystal display modules 4, 5.

Each lighting layer 21, 31 is formed of more than one kind of lighting powder and more than one kind of resin. The lighting layers 21, 31 can be formed of lighting powder and resin with the same color to emit light with the same color. Alternatively, the lighting layers 21, 31 can be formed of lighting powder and resin with different colors to emit light with different colors.

In this embodiment, the back electrode layer 1 is made of aluminum film, whereby the back electrode layer 1 can reflect the light emitted by the lighting layers 21, 31 to project through the transparent substrates 23, 33. Alternatively, the back electrode layer 1 can be made of transparent material, whereby the light of each lighting layer 21, 31 can project through the transparent substrate 33, 23 of the other lighting set 3, 2.

One back electrode layer 1 is co-used by two lighting sets 2, 3 of the double-face lighting electro luminescent (EL) device of the present invention. In addition, the transparent substrates 23, 33 of the two lighting sets 2, 3 achieve the insulating packaging effect. In comparison with the two EL cells used in the prior art, the material of one back electrode layer and two insulating packaging layers is saved. Also, the processing time is shortened and the cost is lowered.

In conclusion, the two lighting sets 2, 3 of the double-face lighting electro luminescent (EL) device of the present invention are respectively overlaid on the first and second faces 11, 12 of the back electrode layer 1. The back electrode layer 1 is co-used by two lighting sets 2, 3. The two front electrode layers 22, 32 and the back electrode layer 1 independently control the lighting sets 2, 3 to respectively emit light. Accordingly, one single EL device can achieve double-face lighting effect.

The above embodiments are only used to illustrate the present invention, not intended to limit the scope thereof. Many modifications of the above embodiments can be made without departing from the spirit of the present invention.

What is claimed is:

1. A double-face lighting electro luminescent device comprising a back electrode layer and two lighting sets overlapped with the back electrode layer, the back electrode layer having a first face and a second face opposite to the first face, the two lighting sets being respectively overlapped with the first and second faces, each lighting set being composed of a lighting layer, a front electrode layer and a film-like transparent substrate which are sequentially overlaid on each of the first and second faces, whereby the two front electrode layers and the back electrode layer control the lighting layers of the lighting sets to emit light.

2. The double-face lighting electro luminescent device as claimed in claim 1, wherein each lighting layer is formed of more than one kind of lighting powder and more than one kind of resin.

3. The double-face lighting electro luminescent device as claimed in claim 1, wherein the two lighting layers are formed of lighting powder and resin with the same color to emit light with the same color.

4. The double-face lighting electro luminescent device as claimed in claim 1, wherein the two lighting layers are formed of lighting powder and resin with different colors to emit light with different colors.

5. The double-face lighting electro luminescent device as claimed in claim 1, wherein the back electrode layer is made of reflective metallic material.

6. The double-face lighting electro luminescent device as claimed in claim 1, wherein the back electrode layer is made of transparent material.

* * * * *